(12) United States Patent
Weiser et al.

(10) Patent No.: US 7,948,386 B2
(45) Date of Patent: May 24, 2011

(54) ELECTRONIC RODENT REPELLER THAT MIMICS A CHATTERING SOUND OF A DISTRESSED RODENT

(75) Inventors: Isaac Weiser, Chatsworth, CA (US); Margaret Weiser, Chatsworth, CA (US); Albert M. Williams, Sylmar, CA (US)

(73) Assignee: Exhart Enviromental Systems, Inc., Chatsworth, CA (US)

( * ) Notice: Subject to any disclaimer, the term of this patent is extended or adjusted under 35 U.S.C. 154(b) by 0 days.

(21) Appl. No.: 12/882,039

(22) Filed: Sep. 14, 2010

(65) Prior Publication Data
US 2011/0002196 A1 Jan. 6, 2011

Related U.S. Application Data

(63) Continuation-in-part of application No. 12/501,368, filed on Jul. 10, 2009, now Pat. No. 7,796,046, which is a continuation of application No. 11/824,912, filed on Jul. 3, 2007, now Pat. No. 7,598,879, which is a continuation-in-part of application No. 11/649,385, filed on Jan. 3, 2007, now abandoned.

(51) Int. Cl.
*G08B 23/00* (2006.01)
(52) U.S. Cl. ............. 340/573.2; 340/384.2; 43/124; 367/139
(58) Field of Classification Search ............. 340/573.1, 340/0.2, 384.1, 636.1, 384.2; 43/124; 367/137–139
See application file for complete search history.

(56) References Cited

U.S. PATENT DOCUMENTS
2003/0201874 A1* 10/2003 Wu ....................... 340/384.2
* cited by examiner

*Primary Examiner* — Jeffery Hofsass
(74) *Attorney, Agent, or Firm* — Cislo & Thomas, LLP

(57) ABSTRACT

A rodent repeller having an audio signal generator configured to generate a chattering sound that mimics a distressed rodent. The audio signal generator produces a variable sound frequency to generate the chattering sound of distressed rodents.

16 Claims, 14 Drawing Sheets

ELECTRONIC RODENT REPELLER THAT MIMICS A CHATTERING SOUND OF A DISTRESSED RODENT

CROSS-REFERENCE TO RELATED APPLICATIONS

This patent application is a continuation-in-part application of U.S. application Ser. No. 12/501,368, filed Jul. 10, 2009 now U.S. Pat. No. 7,796,046, which is a continuation application of U.S. patent application Ser. No. 11/824,912 filed Jul. 3, 2007 now U.S. Pat. No. 7,598,879, which is a continuation-in-part of U.S. application Ser. No. 11/649,385 filed Jan. 3, 2007 now abandoned, which applications are incorporated here by this reference.

TECHNICAL FIELD

This invention relates to electronic devices to non-lethally repel rodents, and more specifically to devices that repel rodents by use of sound or vibration.

BACKGROUND ART

Gardeners are well aware of the damage to plants, flowerbeds, gardens, and lawns that rodents such as moles, voles, and mice can cause. Because of this damage, many people seek to keep rodents away from their gardens and lawns and to be rid of those that are already there. However, people often do not want to trap the animals because of the complexity of positioning a trap, baiting it, checking the trap, removing any caught animals, and then resetting the trap. Traps may also pose a danger to persons or non-pest animals Furthermore, traps that kill the animal are often considered inhumane, gruesome, or otherwise inappropriate solutions to the problem.

One way to combat this problem is by way of rodent deterrent stakes. These devices are generally driven into the ground where they emit sound, ultrasonic frequencies, vibrate, or some combination of those to discourage rodents from occupying the region near the stake or array of such stakes. However, these rodent deterrent stakes often resulted in devices with unsatisfactory battery life and decreased sound output as battery power is expended. In addition, higher frequencies of some alarm and distress calls do not transmit easily or uniformly through soil or around obstructions and are, therefore, not readily detected in burrow conditions. Furthermore, the types of sounds generated are eventually ignored due to habituation and, therefore, the rodent deterrent stakes become ineffective. Therefore, there exists a need to modulate the sounds to exhibit characteristic rates and duration of documented calls of actual rodents.

Therefore, there exists a need for a non-lethal device to repel rodents from gardens, lawns, and the like that amplifies the sounds created by the device or reduces the effect of the factors that dampen the sound. There further exists a need of a device that is least likely to become ineffective due to habituation.

DISCLOSURE OF INVENTION

The rodent repeller of the present invention may have an elongated body, an end cap, an apex, a power supply, an audible signal generator, and an audible signal generator transformer. The rodent repeller may further comprise a mechanism for amplifying a sound generated by the device or reducing the effect of sound-dampening factors. For example, the apex may comprise a plurality of perforations or slits to allow the sound generated inside the device to resonate out of the device with minimal hindrance. In addition, or alternatively, an insertable end may comprise a tympanic resonator to amplify the sound generated by the audible signal generator. Also, the battery life may be extended by coupling the device to solar panels. Furthermore, habituation may be avoided by generating a chatter-sound that mimics the sounds of distressed rodents.

BEST MODE FOR CARRYING OUT THE INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

Figure 1:
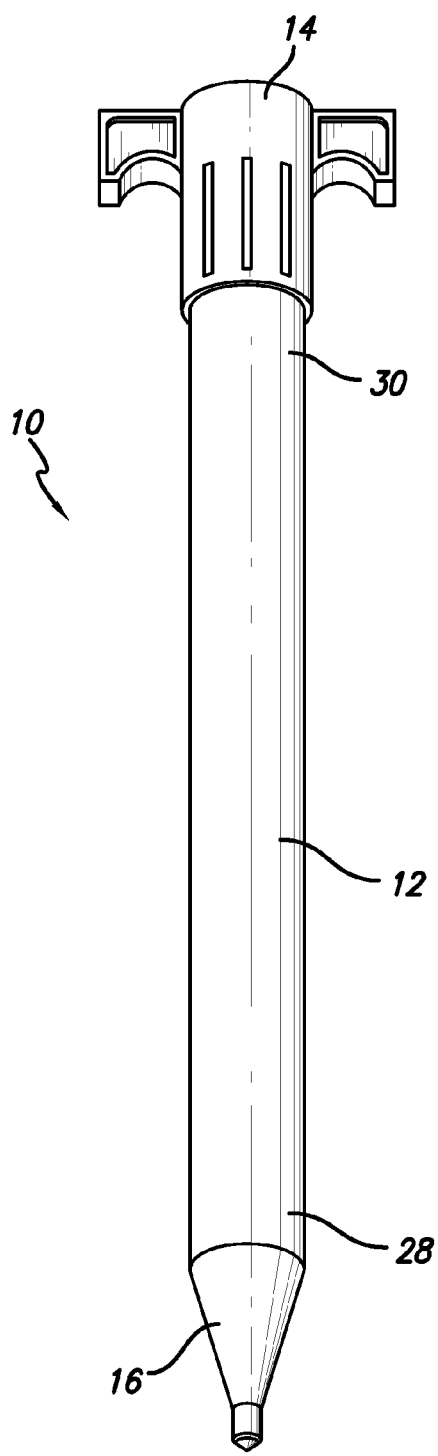
FIG. 1 is a perspective view of an embodiment of an LED signaling electronic rodent repeller.

Referring to the Figures, the present invention is directed to an electronic rodent repeller 10 for insertion into the ground. As shown if FIG. 1, the rodent repeller 10 has an elongated body 12, an end cap 14, an apex 16, a power supply 18, a transducer or an audible signal generator 20, an LED 22, and an electronic controller.

The elongated body 12 has an insertable end 28, a upper end 30, and an outside diameter 32. The upper end 30 may have threads 34. The elongated body 12 is preferably a cylinder or tube, although elongated bodies having a triangular, square, or other polygonal cross-sections are also contemplated.

Figure 3:
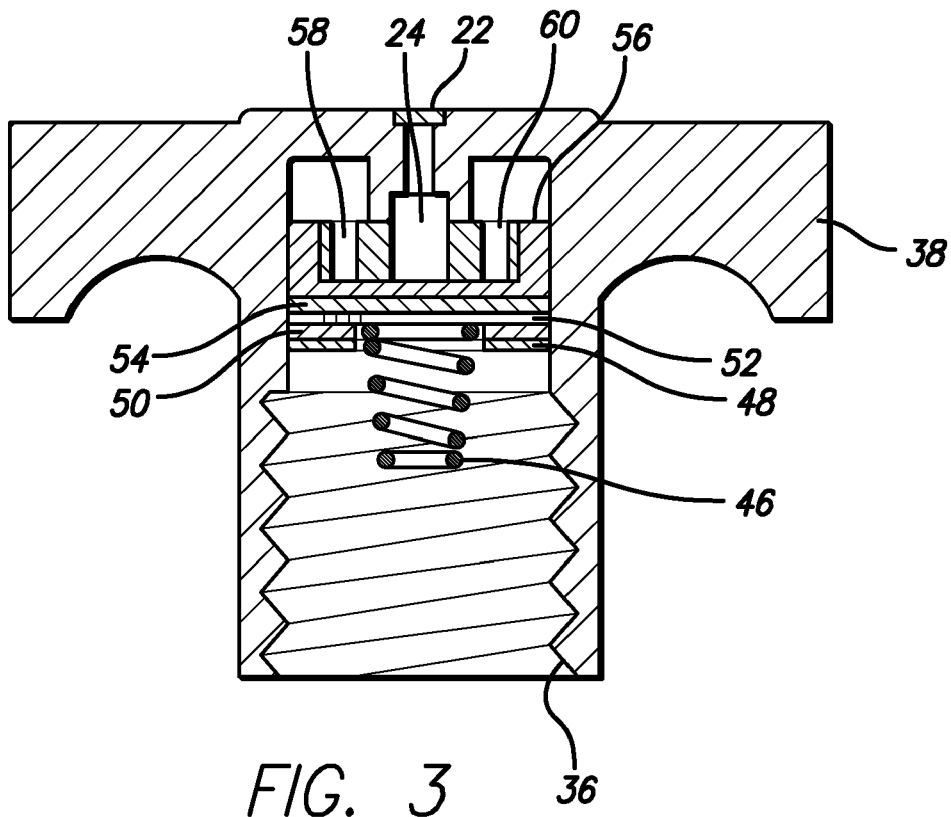
FIG. 3 is a cutaway view of the handle of an embodiment of an LED signaling electronic rodent repeller.
Figure 4:
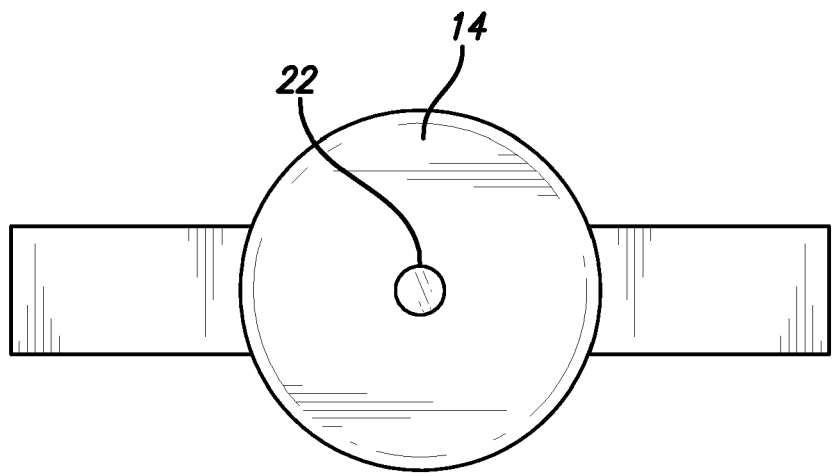
FIG. 4 is a top view of the handle of an embodiment of an LED signaling electronic rodent repeller.

As shown in FIG. 3, the end cap 14 may have threads 36 to mate with the threads 34. The end cap 14 may be threaded to the upper end 30 of the elongated body 12, although it is also contemplated that the end cap 14 be connected to the elongated body 12 by other approaches, such as gluing, welding, interference fit, and other techniques. In some embodiments, the end cap 14 may be a T-bar or T-handle, such that the end cap 14 has two protrusions 38 that emerge perpendicular to the main part of the end cap 14. The protrusions 38 facilitate installation and removal of the end cap 14 from the elongated body 12. The protrusions 38, which may be a jut, projection, or nub, also provide a handle for the user when pulling the electronic rodent repeller 10 from the ground. It is also contemplated that there may be zero, one, or more than two protrusions 38.

The apex 16 is connected to the insertable end 28 of the elongated body 12. The apex 16 may be a cone or pyramid, and it generally defines a pointed or blunted tip for the electronic rodent repeller 10. For embodiments having an elongated body 12 that is cylindrical, the apex 16 is preferably a cone, where the base diameter 40 of the cone is generally equivalent to the outside diameter 32 of the elongated body 12. An apex 16 that is conical further has a second diameter 42 that is smaller than the base diameter 40, such that the cone tapers from the base diameter 40 to the second diameter 42 to permit insertion of the rodent repeller 10 into the ground. For embodiments having an elongated body 12 that has a polygonal cross-section, the apex 16 is preferably a pyramid whose base generally matches the polygonal cross-section of the elongated body 12, such that there is a generally continuous transition between the elongated body 12 and the apex 16. For both the conical or pyramidal apex 16, the apex 16 may taper to a sharp point or to a blunt tip.

Figure 2:
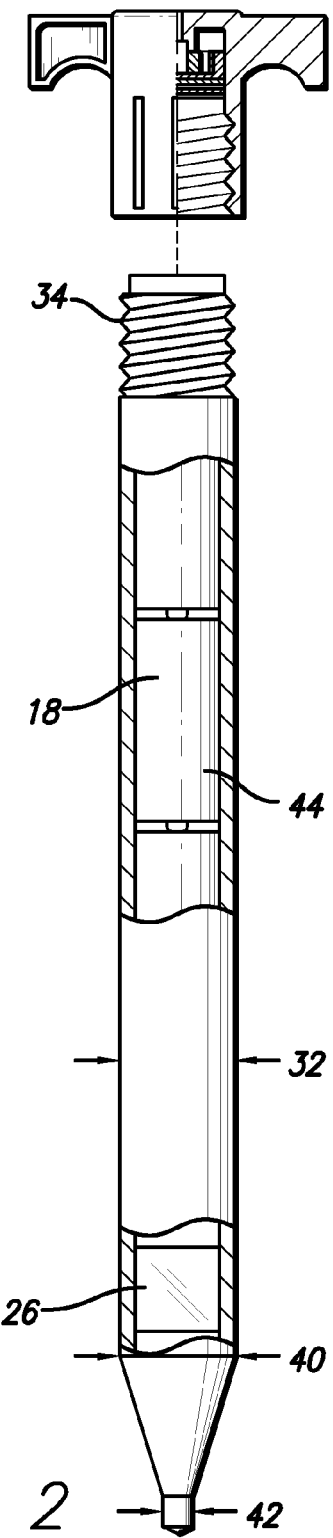
FIG. 2 is a side view of a partially exploded, partially cut away embodiment of an LED signaling electronic rodent repeller.
Figure 5A:
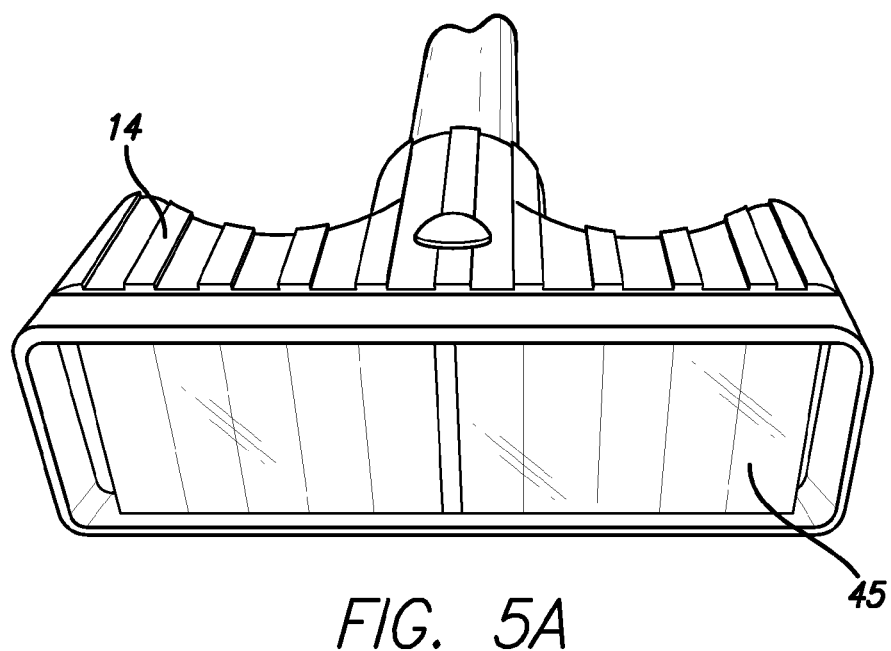
FIG. 5A is a top perspective view of a solar powered embodiment of the electronic rodent repeller.
Figure 5B:
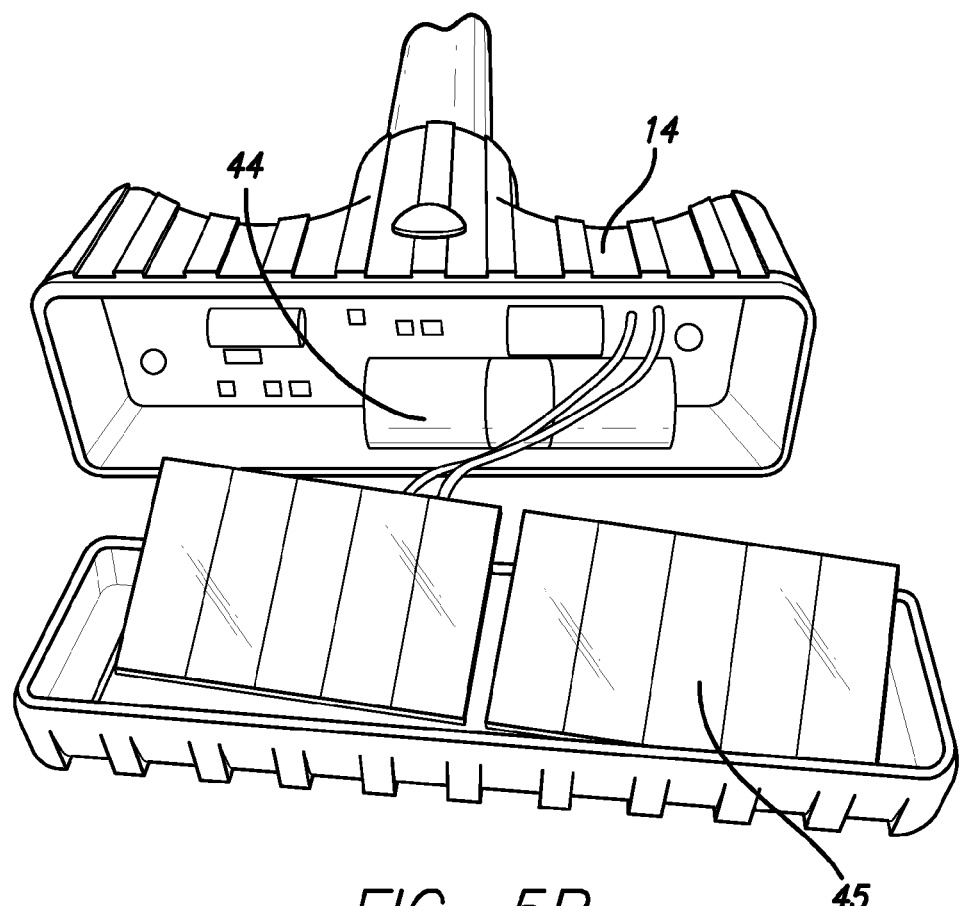
FIG. 5B is a top perspective view of a solar powered embodiment of the electronic rodent repeller with the solar panels removed.

As shown in FIG. 2, the power supply 18 may include a battery 44. In one embodiment, the power supply 18 has four "C" cell batteries. In another embodiment, the power supply 18 has three "C" cell batteries. In another embodiment, the power supply 18 may include photovoltaic cells 45, as shown in FIGS. 5A and B, to generate power from solar energy. The photovoltaic cells 45 can be the primary source of power with the battery 44 serving as a backup when solar energy is not available. In another embodiment, the battery 44 can be the primary source of power with the photovoltaic cells 45 serving as auxiliary power. In another embodiment, the battery 44 can be a rechargeable battery with the photovoltaic cells 45 providing power to recharge the battery 44. The photovoltaic cells 45 may contain a cadmium sulfide element.

The electronic controller connects the LED 22, the power supply 18, and the audible signal generator 20. The electronic controller includes an LED transformer 24, and an audible signal generator transformer 26.

The LED transformer 24 may be a Xicon® 42TL026 transformer, which is commercially available from Mouser Electronics, Inc., 1000 North Main Street, North Mansfield, Tex. 76063. Preferably, the LED transformer 24 is a Pico Electronics type 81165 transformer, which is commercially available from Pico Electronics USA, 7920 Tapia Street, Fontana, Calif. 92336. The Pico transformer is preferred, in part, because its volume is about one-third that of the Xicon® transformer. However, it is equally contemplated that other transformers may be utilized in the electronic rodent repeller 10.

The audible signal generator transformer 26 controls power to the audible signal generator 20. The audible signal generator transformer 26 may be located within the end cap 14, or it may be located immediately adjacent the audible signal generator 20. In some embodiments, the audible signal generator transformer 26 may be integral to the audible signal generator 20, for example, when the audible signal generator 20 is the purchased subassembly type KS-8406 referred to below.

The LED transformer 24 controls the amount of current received by the LED 22 to provide a visual indication of relative electric potential of the power supply 18 or the operability of the audible signal generator 20. Preferably, there is a 3:1 ratio between the brightness of the LED 22 at generally full power (e.g. fresh batteries producing about 6 volts) and the brightness of the LED 22 at minimum usable power (e.g. partially used batteries producing about 2.5 volts). The LED brightness is given by the equation $B=10\exp\{[10\exp(-4/3)][10\log_{10}(I2/I1)]\}$, where I1 is the measured illuminance at low voltage (e.g. 2.5 volts) and I2 is the measured illuminance at high voltage (e.g. 6 volts).

In embodiments of the invention having a resonant reed sounder, light may be emitted by the LED 22 as a result of polarized pulses of current that pass through the LED transformer 24 and into the LED 22 at the frequency of the resonator. This frequency is generally about ten times greater than the flutter detection frequency of the human visual system. As such, a constant, uniform intensity is generally perceived by a human observer. If the resonator is modulated at a frequency within about ten percent of the self-resonant frequency or at a frequency below about one-tenth self-resonant frequency, that modulation will generally appear as bursts of light or pulsating (integrated) light.

The LED 22 thus provides a visual signal to the user of the condition of the power supply 18. When the LED 22 is relatively bright, the supplied power is relatively high, and when the LED 22 is relatively dim, the supplied power is relatively low. When the LED brightness is between the relatively high and relatively dim levels, an intermediate amount of supplied power is indicated. When the LED 22 is not lit, the power supply is generally below a useable level such that the audible signal generator 20 may not be operating at a level sufficient to repel rodents. When the power level is relatively low, the user may want to renew the power supply by, for example, replacing any batteries. Using a light meter to test an embodiment of the invention, the inventors noted an actual illuminance of about 73 lux at a battery voltage of about 2.5 volts and an actual illuminance of about 565 lux at a battery voltage of about 6.0 volts. These values resulted in a brightness range of about 2.6:1 over the battery range from 2.5 volts to 6.0 volts. In some embodiments, an unlit LED 22 may also indicate that the audible signal generator 20 is not functioning for a reason other than a low power supply, such as a short circuit, open circuit, or other failure of the audible signal generator 20. In such embodiments, a lit LED 22 may also indicate that the audible signal generator 20 is properly functioning.

The audible signal generator 20 or transducer, which may be a noisemaker, buzzer, chime, vibrator, and the like, is generally located at the insertable end 28 of the elongated body 12. This position allows the audible signal generator 20, when the electronic rodent repeller 10 is installed in the ground, to be at an appropriate depth beneath the surface of the ground to permit the sound or vibration produced by the repeller 10 to travel through the ground. The audible signal generator 20 may be any device that produces an audible or vibratory signal perceivable by rodents. Preferably, the audible signal generator 20 is a resonant reed sounder, such as a type KS-8406 or a type KS-3603. A resonant reed sounder, also known as a Helmholtz resonator, is preferred since it helps bring about the battery longevity discussed below.

In one embodiment, the audible signal generator 20 can generate a rhythmic audible signal. In another embodiment, the audible signal can be a tone mode to produce a continuous sound. In a preferred embodiment, the audible signal can be modulated to enter a chat mode to produce a chatter sound. A chatter sound is a temporal structure of an animal voicing. The chatter sound more closely mimics the distressed or frightened sound made by a burrowing rodent than other devices by capturing the rhythm and episode duration, characteristic of agitation and foment caused by fear and pain. As such, the chatter sound is least-likely to be ignored due to habituation, which is a common cause for these units to lose effectiveness over time. The chatter sound is also designed to transmit more deeply into the soil due to its pulsating low frequency. In addition, chatter sounds are less likely to be masked by natural sounds, such as wind and rain due to the constant on/off pattern used to generate chatter sounds.

In a preferred embodiment, the sound generated is a short sound burst or envelope followed by a dwell time or a pause. The timing of the sound would be based on a random delivery schedule of a single sound burst in a 30 second to 3 hour period constituting a time episode. Preferably the time episode is one sound burst every 30 minutes to 3 hours. It is believed that this will be most effective because it tends to renew the alert bio-reflex mechanism and delay habituation in a rodent. In addition, the extended delay of the time episode will afford reduced operating cost and/or allow higher output intensities during broadcast episodes.

The sound burst is generated by the audible signal generator, which is any sound generating device that can create a chatter sound. In a preferred embodiment, the chatter sound is created by a Helmholtz Resonator. In this process incidental harmonics and other frequencies that originate in the hammer mechanism create an inherent raspy sound consistent with rodent voicing patterns. The chattering sound may also be created by recording the actual rodent chattering sounds with a recording device and replaying the sounds at the desired intervals. The chattering sounds may also be computer generated. The chattering sounds may also be generated underground as well as above ground.

The chatter sound may include a range of voicings including chats, chatter-chatts, chips, chipping, chippering, and chucking. One of the most effective voicings is the chip characterized by an approximately 50 msec upsweep from approximately 2 KHz to approximately 14 KHz followed by a 50 msec downsweep which is then repeated after a 150 msec pause. This chatter-sound was reported to be effective in causing all chipmunks to flee the area. The time envelope rate or cycle rate was about 4 chips/sec or 4 Hz.

Figure 8:
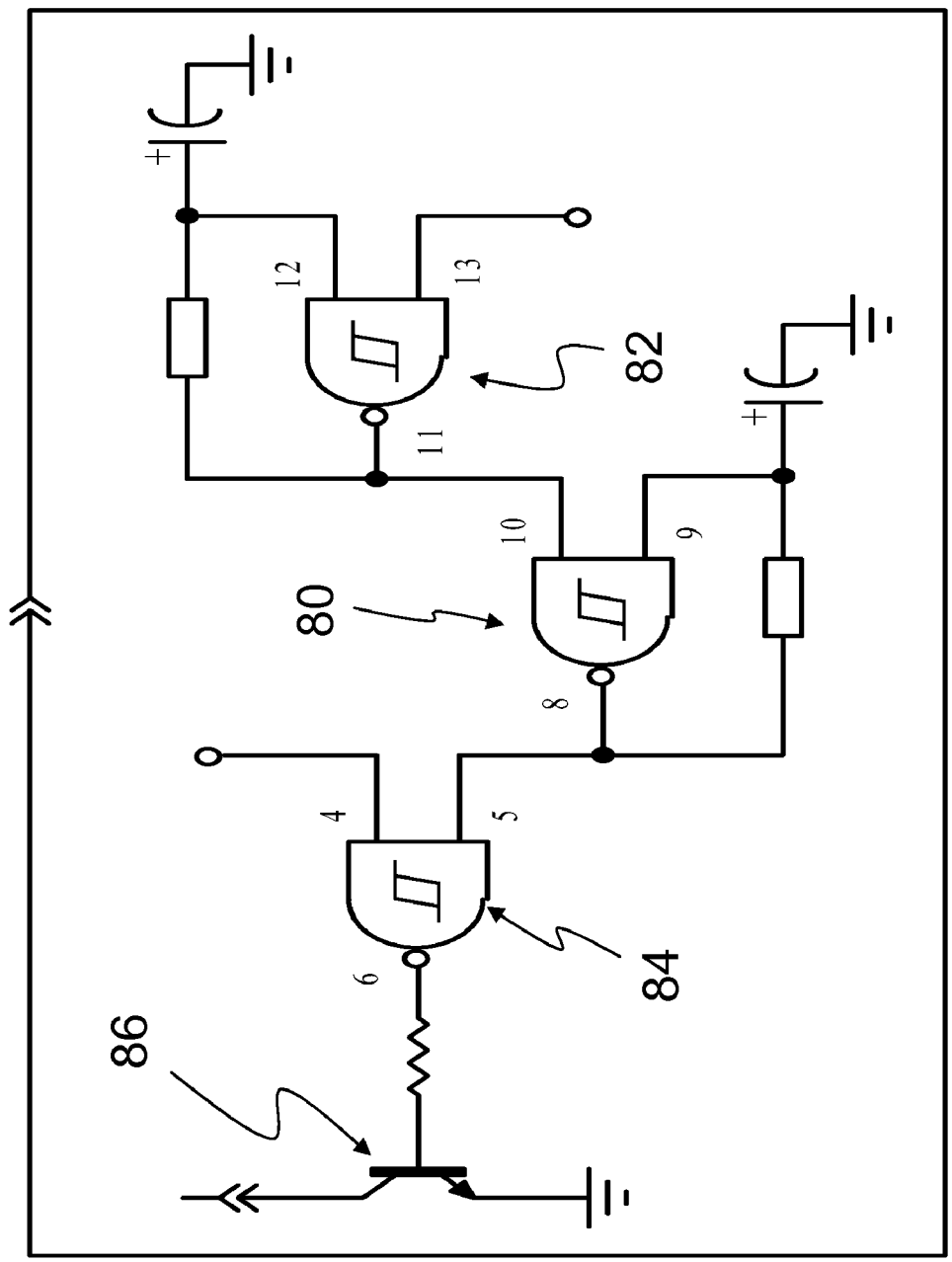
FIG. 8 is a logic diagram for generating the chatter sound.

FIG. 8 shows a logic diagram of the generation of the chatter sound. This logic is arranged for NPN driver circuits such as found in the KS-8406 3-terminal sounder device. These circuits typically have 6-volt operating systems and the preferred IC is N74HC132. One-volt products generally use KS-3603 2-terminal sounders with external PNP drivers and an IC type 74LV132D.

A first NAND gate and passive components attached thereto constitute an oscillator 80 of variable duty-cycle to produce the chatter sound. This chat-sound origination is gated by the output from a second NAND gate and passive components connected thereunto constituting an episode timer 82. The episode timer 82 controls both active and inactive periods. A third NAND gate section is designated as a driver 84, which passes control information to the Helmholtz Resonator NPN switching transistor 86. An episode thus controlled is characterized by pulses of variable duration within a variable active period. Distinctive sound properties are a function of pulse repetition rates set within a narrow frequency range creating a sound burst of approximately 20 msec to approximately 200 msec in duration and a frequency or cycle rate of about 1 Hz to about 20 Hz or about 1 sound burst per second to about 20 sound bursts per second. Preferably the sound burst is approximately 50 msec to approximately 100 msec with a frequency or cycle rate of about 4 Hz to about 11 Hz or about 4 bursts per second to about 11 bursts per second. More preferably, the cycle rate is about 7.4 Hz or about 7.4 bursts per second. The sound pressure level (SPL) measured at the apex 16 is approximately 50 decibels (dB) to approximately 150 dB. Preferably, the SPL is approximately 85 to approximately 120 dB. More preferably, the SPL is 105 dB at the apex 16.

Figure 9:
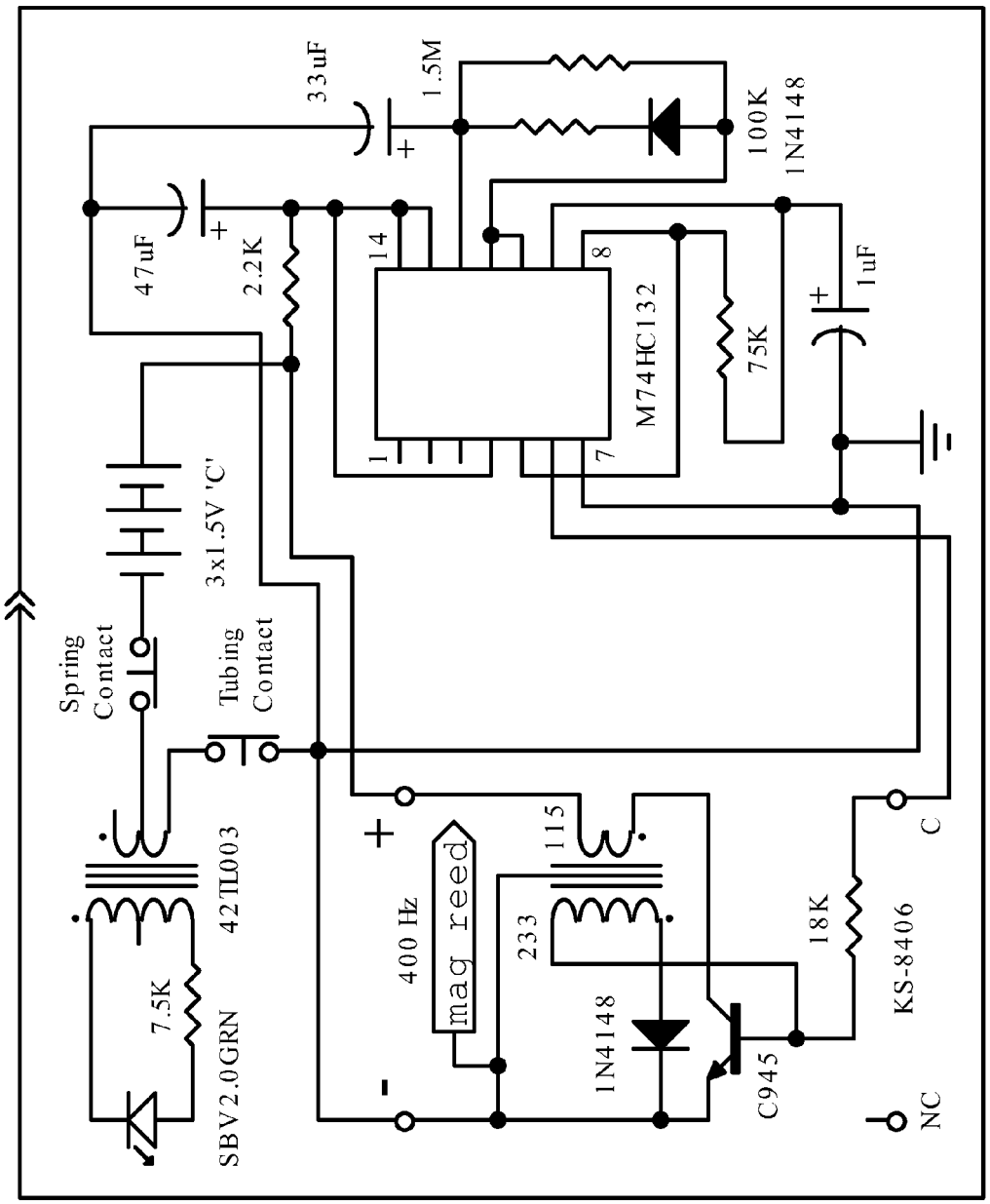
FIG. 9 is an example of a circuit diagram implementing the concepts of the logic diagram in FIG. 8.

FIG. 9 is an example of a circuit diagram to implement the concepts of the block diagram shown in FIG. 8. The embodiment of the rodent repeller implementing this circuit diagram utilizes three "C" batteries (7100 mAh alkaline), has a lower cost timing IC, keeps KS-8406 buzzer and use without driver transistor, adds the chatter sound, and continues to utilize the LED indicator.

Figure 10:
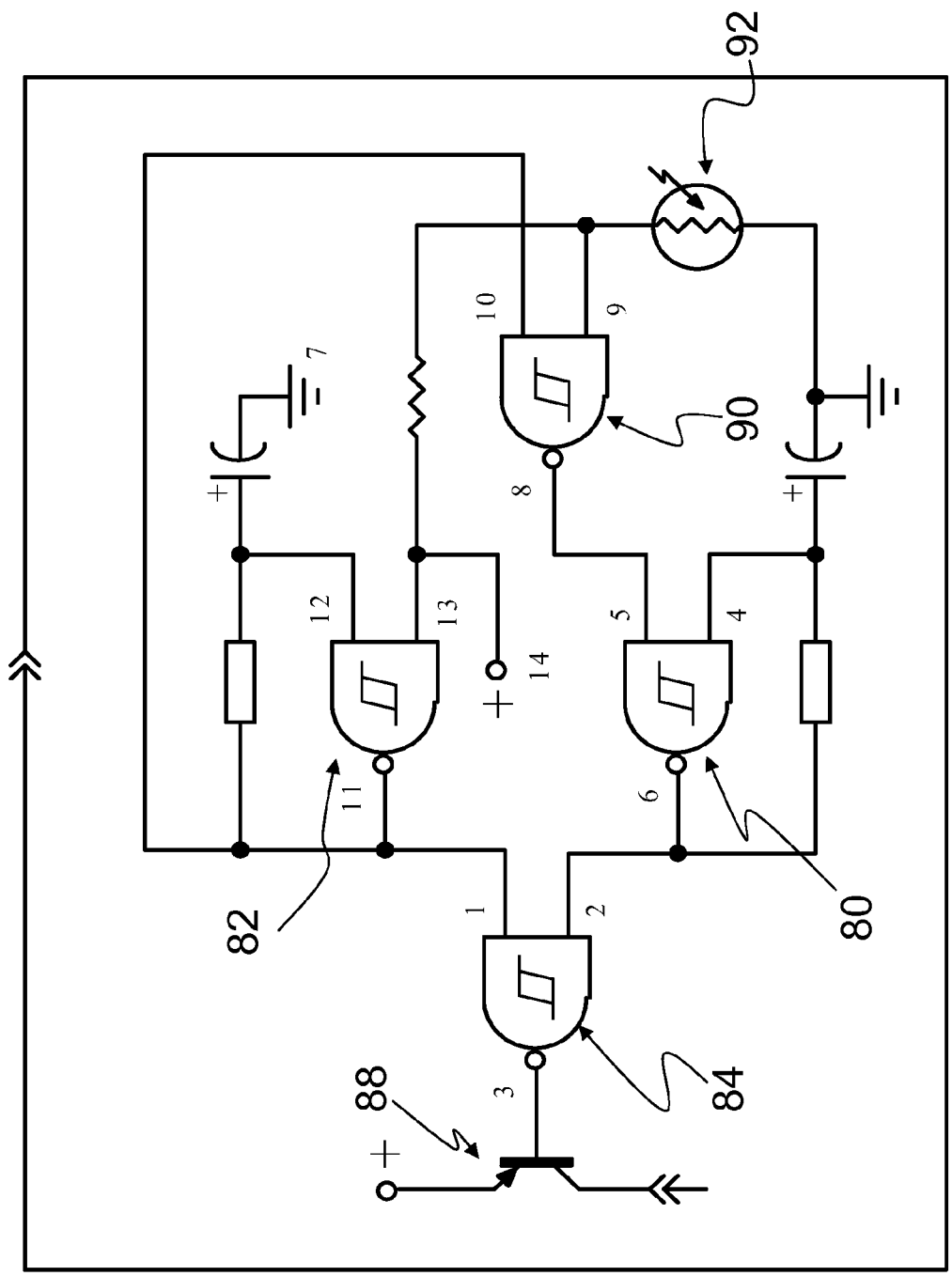
FIG. 10 is a logic diagram for generating the chatter sound for an embodiment using solar power.

FIG. 10 shows a logic diagram of an embodiment of this invention using solar power. The solar powered rodent repeller also comprises a first NAND gate and passive components attached thereto constituting an oscillator 80 of variable duty-cycle to produce the chatter sound; a second NAND gate and passive components connected thereunto constituting an episode timer 82 to control both active and inactive periods; and a third NAND gate section designated as a driver 84; however, oscillator 80, timer 82, and driver 84 are coupled as shown in FIG. 9 to compensate for the drive phase for a PNP transistor 88. In addition, the solar powered rodent repeller comprises a fourth NAND gate constituting a solar gate 90 to perform solar status control. The sun is detected by a solar resistor 92. The solar resistor 92 may be a cadmium sulfide element. When the episode timer 82 is low the PNP transistor 88 is off. When the episode timer 82 is high the PNP transistor state depends on the solar input. When the sun is detected by a photo-resistor 92 the solar gate 90 goes to a low logic state where it will remain as long as solar intensity is above 0.25 w/m$^2$ (watts/square-meter) (about 30 Lux CIE). In sunny places, for example Southern California, solar power density exceeds 0.25 w/m$^2$ from approximately 6 AM to approximately 6 PM on a clear summer day. In severe overcast and after sunset, the solar gate 90 will be set high to recall the tone mode during active time periods.

When the sun is detected the oscillator 80 is activated and its output will turn the PNP transistor 88 on and off at a pre-set rate of about 7 Hz as long as the episode timer 82 is in a high state. When the sun goes down or during severe overcast the PNP transistor 88 will react only to the episode timer 82 input and enter a tone mode, which is distinguishable from the chat mode. The tone mode provides a normal repetitive on and off sequence comprised of a short tone burst followed by a long dwell period. In one embodiment, the sound is a monotonic 400 Hz, unmodulated sound output lasting from approximately 1.5 seconds to approximately 2 seconds followed by a silent interval from approximately 30 seconds to approximately 45 seconds. The chat mode is reactivated at dawn. This particular operational mode is considered to be most disturbing to burrowing rodents because of their nocturnal nature, foraging at night and sleeping during the day.

Figure 11:
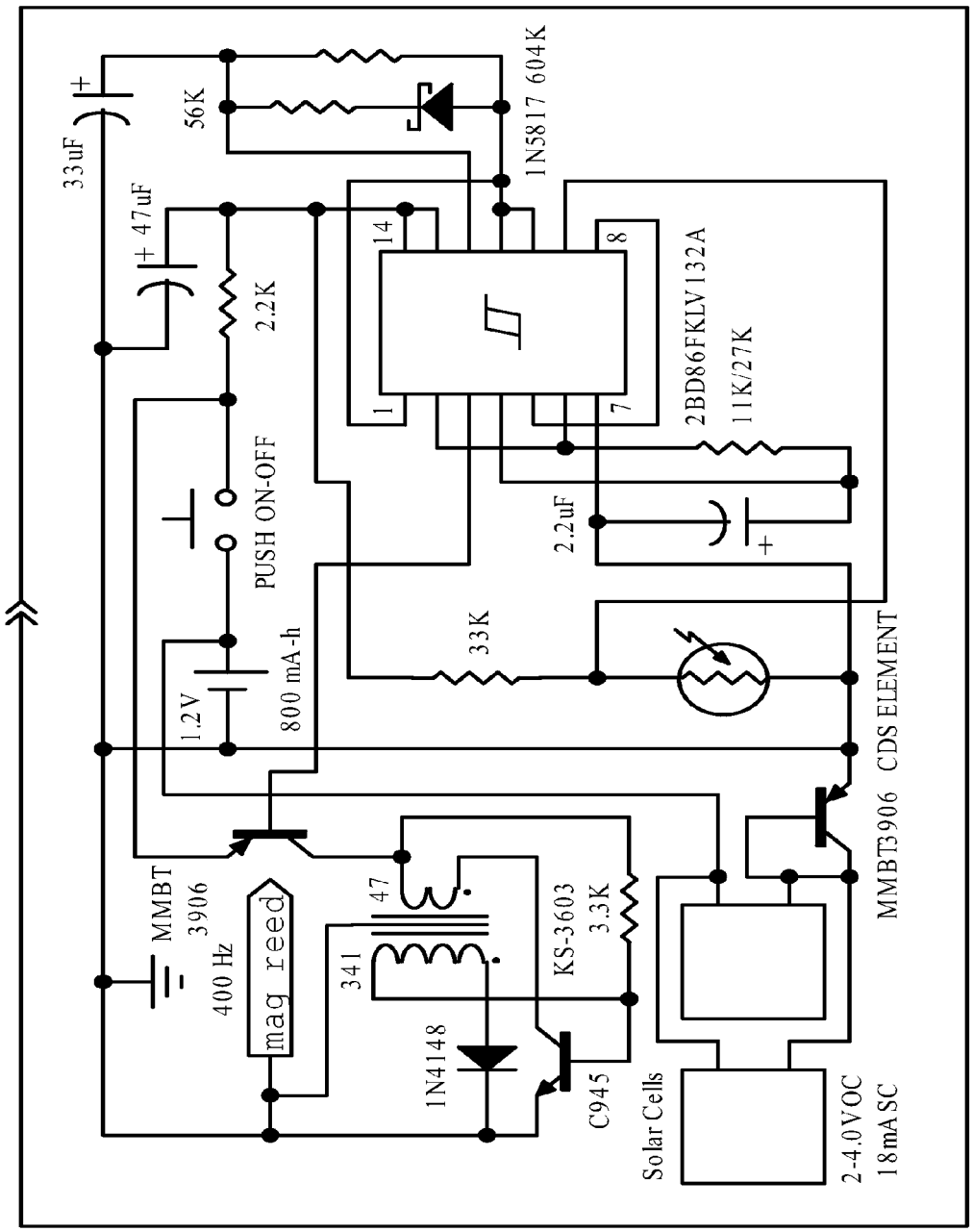
FIG. 11 is a circuit diagram implementing the concepts of the logic diagram in FIG. 10.

FIG. 11 is a circuit diagram implementing the concepts of the block diagram shown in FIG. 10. In another embodiment, chat-sound may be modulated during tone-mode to provide for various chat-sound episodes.

Figure 6A:
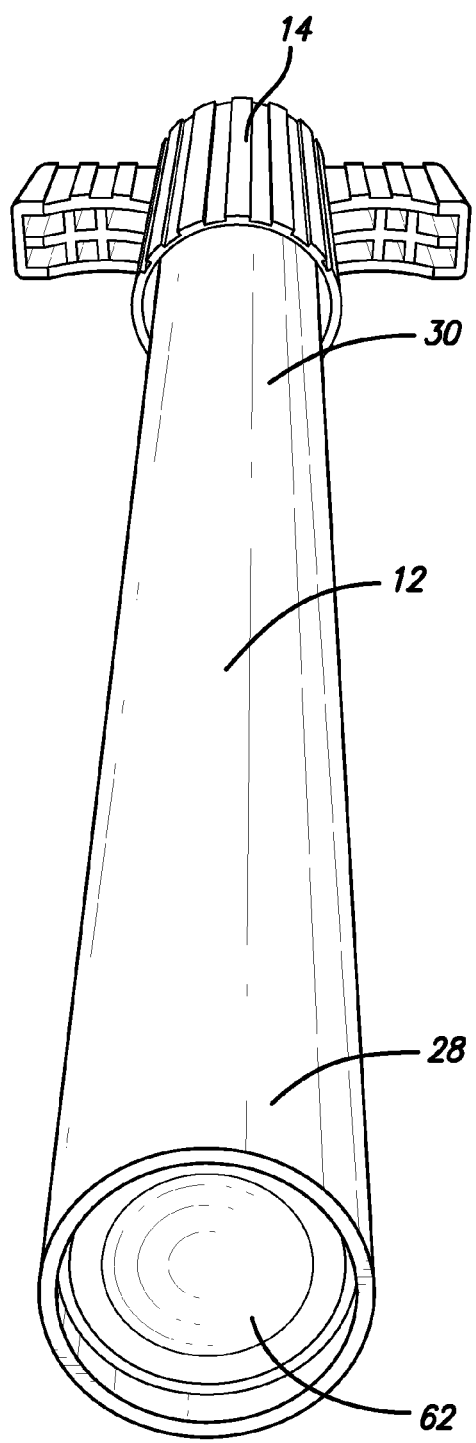
FIG. 6A is a bottom perspective view of a rodent repeller with the apex removed.

In another embodiment, the audible signal can be amplified with a tympanic resonator 62, as shown in FIG. 6A. The tympanic resonator can be located at any location along the elongated body 12. The placement of the tympanic resonator 62 can also be used to tune the pitch of the sound generated. For example, the audible signal generator 20 can be located at the upper end 30. This will cause a vibrating air column down the elongated body 12. By placing the tympanic resonator 62 near the audible signal generator 20 the vibrating air column is shortened, thereby creating a higher pitch. Placing the tympanic resonator 62 further away from the audible signal generator lengthens the vibrating air column, thereby lowering the pitch. In one embodiment the tympanic resonator 62 is located at the insertable end 28 between the insertable end 28 and the apex 16.

The tympanic resonator 62 can be made of any material that is stiff, elastic and conducive to amplifying sound. For example, the tympanic resonator 62 can be made of plastic, such as polypropylene, metals, such as aluminum, and composite materials, such as fiber-reinforced materials, and thermoplastic polymer resin such as polyethylene terephthalate sold under the trademark Mylar®. The tympanic resonator 62 may be approximately 0.05 mm thick to approximately 1 mm thick. Preferably, the tympanic resonator 62 is approximately 0.1 mm thick to approximately 0.33 mm thick.

The tympanic resonator 62 is attached to the elongated body with any type of fastening device. Preferably, the tympanic resonator 62 is sealed to the tympanic resonator with a water-resistant adhesive. Using a water-resistant adhesive prevents water from entering into the elongated tube and protects the electrical wiring of the rodent repeller 10.

In another embodiment, the audible signal can be amplified by including at least one opening 64 at the apex 16. An opening 64 at the apex, minimizes the impedance or dampening to the sound propagation caused by the walls of the apex 16. Preferably, the apex comprises a plurality of openings 64. In one embodiment, the apex 16 comprises openings on the side. However, the opening can be located anywhere on the apex.

Figure 6B:
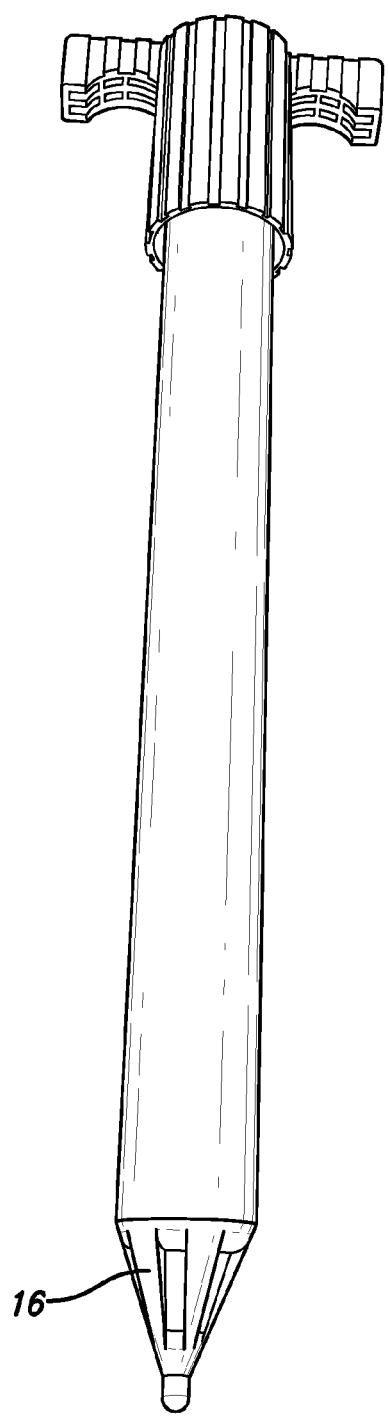
FIG. 6B is a perspective view of another embodiment of the rodent repeller.
Figure 7A:
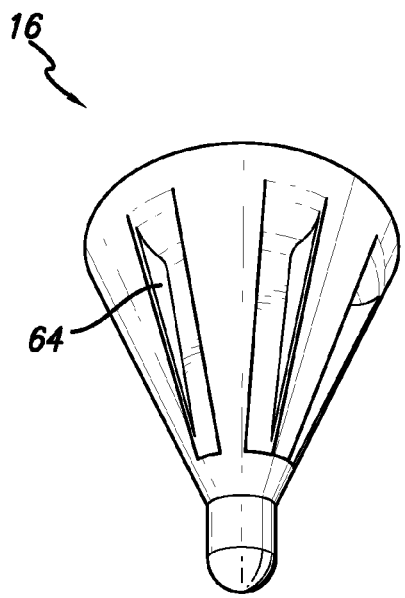
FIG. 7A is a perspective view of the apex depicted in FIG. 6B.
Figure 7B:
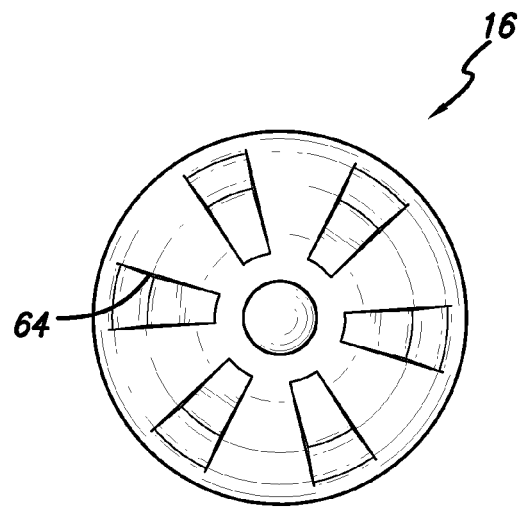
FIG. 7B is a bottom view of the apex in FIG. 7A.
Figure 7C:
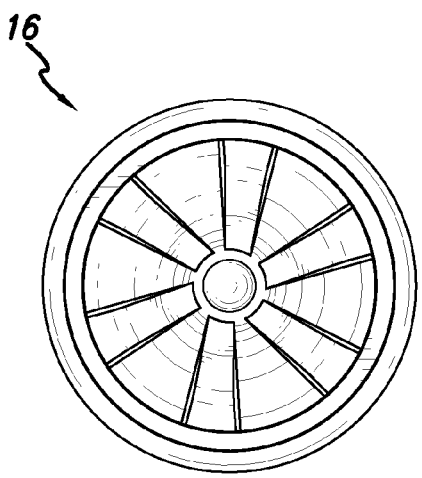
FIG. 7C is a top view of the apex in FIG. 7A.
Figure 7D:
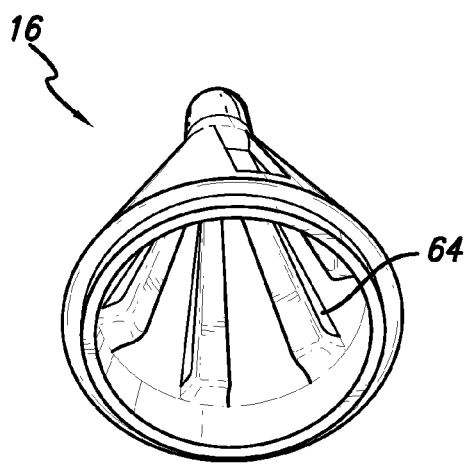
FIG. 7D is a perspective view of the apex in FIG. 7A.

The openings 64 can be in any shape. In one embodiment, the openings 64 are a plurality of longitudinal slits along the circumference of the side of the apex 16, as shown in FIG. 6B. The openings 64 may be horizontal, oblique or any combination thereof. In a preferred embodiment, the slits are created by creating a plurality of indented walls into the surface of the apex or radially shifting portions of the apex inward as shown in FIGS. 7A-D. Providing indented walls with slits along the sides helps reduce excess dirt from entering into the apex.

The LED 22 may be a standard light emitting diode and it may be a super bright LED. The LED 22 is preferably a 3 mm green LED, such as a model number RL3-G4518. However, the LED 22 may emit light of various colors such as white, green, red, blue, amber, and others. It is also contemplated that other small light bulbs or other light sources may be used with the device.

The LED transformer 24 and LED 22 are preferably located within the end cap 14. This placement allows for ease of access, maintenance, or retrofit of similar units where desired. The end cap 14 may further contain a battery spring 46, a contact ring 48, a fiber insulator 50, a spring plate 52, and a neoprene washer 54. A ground circuit pin 58 is connected to the contact ring 48, and a negative battery pin 60 is connected to the battery spring 46 via the spring plate 52. The connections may be by welding, soldering, or otherwise attaching the pin to its respective connecting structure. Along with a fastener, such as a screw, through the spring plate 52 and extending into the end cap 14, there may be push-on clips on the ground circuit pin 58 and the negative battery pin 60 to further secure the assembly to the end cap 14.

In the depicted embodiment, the battery spring 46 extends through a space in the center of the contact ring 48 to connect to the spring plate 52. The contact ring 48 and the spring plate 52 are separated by the fiber insulator 50. The neoprene washer 54 separates the spring plate 52 from the plug 56. The plug 56 may be an acrylonitrile-butadiene-styrene (ABS) insulator. The spring plate 52, contact ring 48, fiber insulator 50, and neoprene washer 54 may be permanently bonded together for ease of installation or retrofit of similar rodent repeller devices.

In the preferred embodiment, the rodent repeller 10 is activated by twisting the end cap 14 about the elongated body 12 in a direction corresponding to tightening the end cap 14 onto the elongated body 12. When the end cap 14 is twisted such that the contact ring 48 contacts the elongated body 12 and the battery spring 46 contacts the negative terminal of the power supply 18, an electric circuit is completed between the power supply 18, the audible signal generator 20, and the LED 22. Activation by other techniques, such as by push button, toggle switch, or sliding the end cap, are also contemplated. Once activated, some versions may be sealed against the weather or to prevent tampering. The connection of the power supply 18 to the audible signal generator 20 produces an audible or vibratory signal to discourage rodents from remaining in the vicinity of the rodent repeller 10. Furthermore, connection of the power supply to the LED 22 produces a visual indicator that the rodent repeller 10 is operable.

Along with ease of use and providing a visual indication that the device is operating, another advantage of the invention is increased battery life. By reducing the drive current to the audible signal generator or resonant reed sounder, the inventors were able to improve battery longevity by about 8%, while only having about a ½ dB reduction in sound pressure level. For example, the standard buzzer input power is about 25 mW at about 4.25 volts DC. A reduction in buzzer input power to about 21.1 mW at 4.25 volts DC (from a reduction in current of about 8.8%) produced a reduction in loudness of about 0.6 dB. Since a change in sound pressure level of less than 1 dB is generally considered to be below the human perception threshold, a 0.6 dB reduction is inaudible.

A single electro-magnetic transducer supplies only temporal information through low frequency vibration and a modulated carrier wave. Animal voicings of targeted pests have, in addition to the low frequency transmissions, sonic frequency components up to 14 KHz. Some voiced calls also include frequency bursts in the low ultrasonic range. Currently, there is no single transducer that has the small size and conversion efficiency that meets the unique demands of synthesizing animal alarm and distress call compositions ranging from sub-sonic to ultrasonic frequencies.

To overcome this problem selective, simultaneous transmission through dual (or multiple) transducers may be utilized to produce the most realistic and effective call synthesis. An example is the combination of a ceramic piezo element 100 and an electro-magnetic element 102 which together cover the entire range from 3 Hz to 150 KHz.

A single transducer conformed to deliver both infra-sonic and low frequency sonic output combined to mimic basic characteristics of voiced alarm and distress calls of pest rodents. The combination is particularly effective for subterranian transmission of cadence information. However, surface-wave transmission requires detailed information in the higher frequency audible range and inclusion of ultrasonic orchestration with distinction.

High definition chat-sound may be gained by the addition of efficient high frequency output transducers for definitive realism in comprehensive call synthesis. Certain programmable ultrasonic calls are independent and asynchronous with other calls which may or may not possess cadence structure. This class of call may be delivered through a secondary transducer that may or may not require an independent driver. In some cases a parallel connection of the low frequency and the high frequency transduction elements is possible and effective for a particular application. Examples of transducers include ceramic piezo devices 100 and electro-magnetic units 102.

The ultrasonic element can also be used independently for control of bats, moths, and a variety of insects while being installed as a feature in electronic rodent repeller. However, the control mechanism here may not be repellency but rather attraction of bats for the consumption of moths that may be in confusion caused by targeting ultrasonic sequences.

Figure 12:
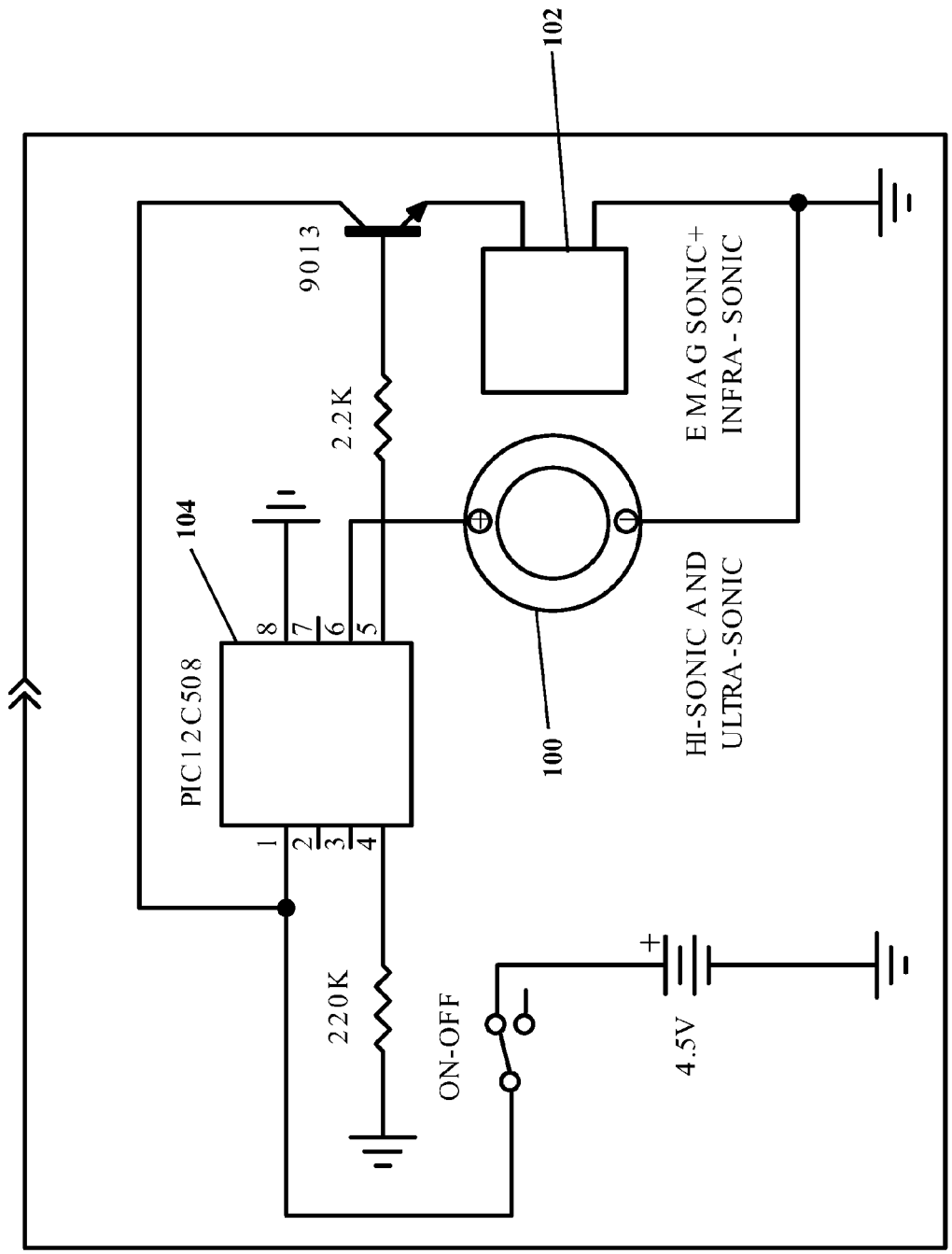
FIG. 12 is a circuit diagram of an electronic rodent repeller with multiple transducers.

Advanced, accurate chat-sound synthesis using dual sound sources is illustrated in the logic diagram shown in FIG. 12. I/O port #6 serves as the driver for the representative ceramic piezo element 100. In some embodiments, the two elements emit synchronous bursts of various frequencies in the audio range as necessitated by voicing spectra, both consonant and dissonant. Some applications require modulated ultrasonic frequencies which are also generated by the ceramic piezo device 100 and managed by the embedded microprocessor 104.

Figure 13:
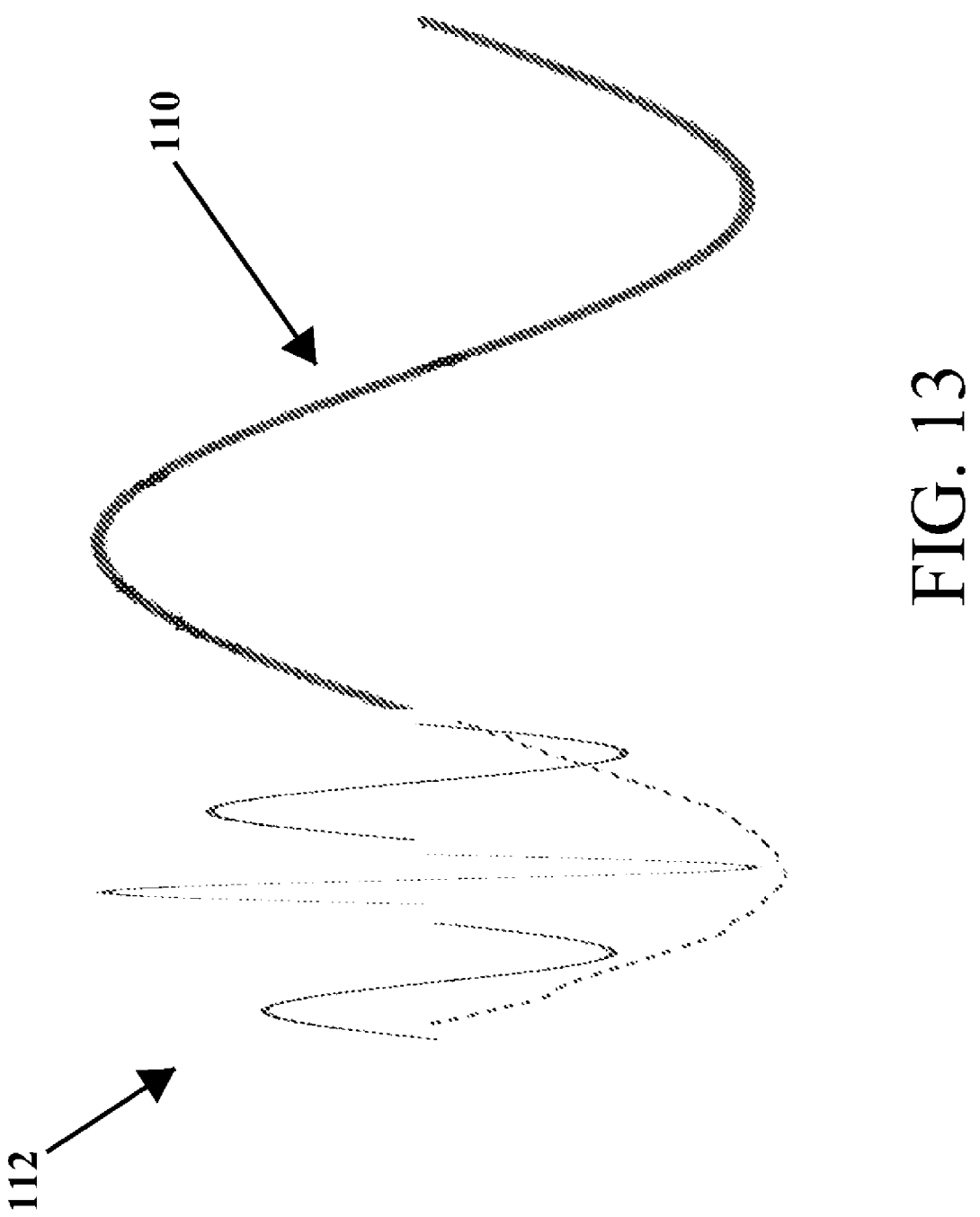
FIG. 13 is an example of a waveform generated by an embodiment of an electronic rodent repeller having multiple transducers.

FIG. 13 shows an example of waveforms that represent components of the compound sonic pressure wave output synchronized by temporal switching The initial chirp sweep 110 is output from the ceramic piezo transducer 100 while the carrier 112 is generated by the electro-magnetic unit 102. The leading edge of the chat sound pulse grouping contains a 2K-4.8 KHz sonic sweep ahead of the modulated 400 Hz carrier. Sweep width of the leading edge 'chirp' may exceed 40 msec to include about 100 cycles of the high-sonic burst prior to carrier introduction.

Figure 14:
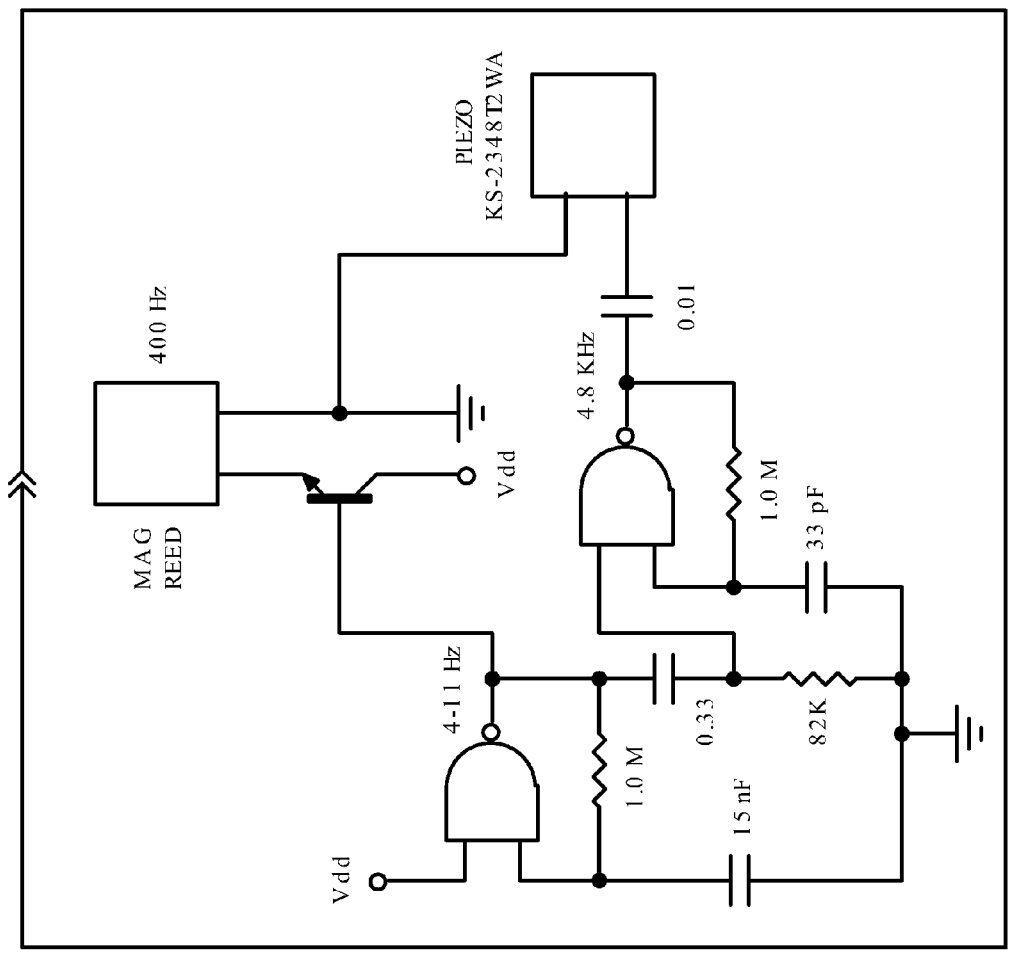
FIG. 14 is a circuit diagram of another embodiment of an electronic rodent repeller with multiple transducers.
Figure 15:
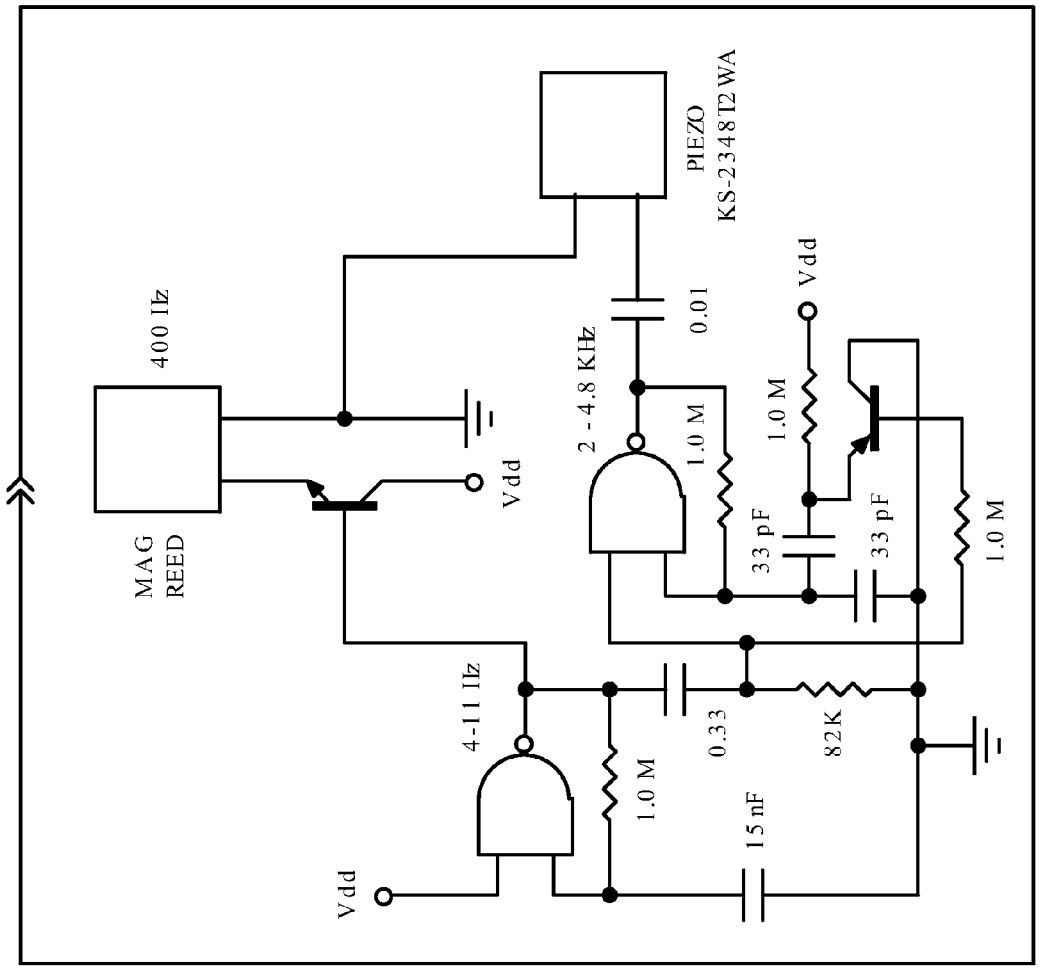
FIG. 15 is a circuit diagram of another embodiment of an electronic rodent repeller with multiple transducers.
Figure 16:
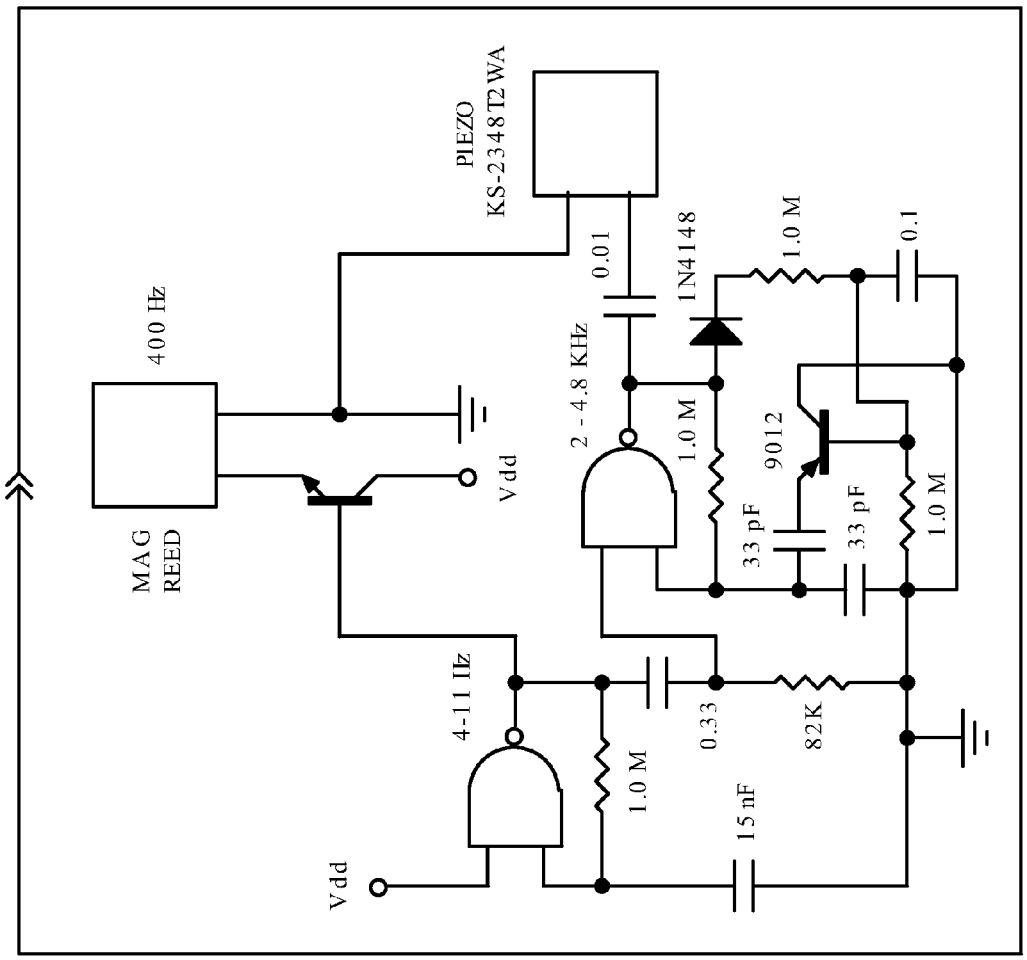
FIG. 16 is a circuit diagram of another embodiment of an electronic rodent repeller with multiple transducers.

Compound chat-sound outputs like this can be delivered from electronic circuits as shown in FIGS. 14-16 or by software control of embedded microprocessors 104, such as the PIC12C508.

The circuit diagram shown in FIG. 14 does not provide a frequency sweep within the chirp period. Instead, a 4.8 KHz burst occurs in concert with all chat pulses within a voicing.

In the circuit diagram shown in FIG. 15, current through the 82K resistor and the 0.33 microF capacitor increases at the leading edge of each temporal pulse causing the chirp oscillator to switch-on and the transistor to slowly turn off, raising oscillator frequency in its transition. Voltage across the 82K resistor will crest above switch-on level then begin to fall as the temporal pulse continues. A 'chirp' is thus produced at the beginning of every pulse in the string which constitutes a voicing.

Utilizing the circuit diagram shown in FIG. 16 results in the chirp oscillator being activated by current through the 0.33 microF capacitor at the leading edge of each temporal pulse. Initially both 33 pF capacitors are paralleled to begin the 2-5 KHz up-sweep chirp. As oscillation continues a charge is accumulated on the 0.1 microF capacitor and the transistor is gradually turned off eliminating the effect of the emitter coupled 33 pF capacitor and causing oscillator frequency to rise towards 5 KHz. Rising current through the 0.33 microF capacitor will crest and begin to fall in about 40 msec. A short termed frequency decrease may occur before the oscillator turns off and the chirp comes to an end.

While the present invention has been described in regard to particular embodiments, it is recognized that additional variations of the present invention may be devised without departing from the inventive concept. For example, the audible signal can be a sound imitating the frightened sounds of any other type of animal that the user wishes to repel. Alternatively, the audible signal can be the sounds made by a predator of the type of animal the user desires to repel.

INDUSTRIAL APPLICABILITY

This invention may be industrially applied to electronic devices that non-lethally repel rodents by use of sound and vibration.

What is claimed:
1. An electronic rodent repeller, comprising:
(a) an elongated body having an insertable end, an upper end, and an outside perimeter;
(b) an end cap connected to the upper end of the elongated body;
(c) an apex at the insertable end of the elongated body;
(d) a power supply operatively connected to the electronic rodent repeller; and
(e) an audible signal generator located within the electronic rodent repeller, wherein the audible signal generator produces an audible signal in the form of a chattering sound that mimics a distressed rodent to discourage the rodent from remaining in a vicinity of the rodent repeller, wherein the chattering sound comprises a variable sound frequency characterized by an upsweep from approximately 2 KHz to approximately 14 KHz followed by a downsweep.

2. The electronic rodent repeller of claim 1, further comprising a circuit that generates a dual mode sound, the dual mode sound comprising a first mode and a second mode, wherein the first mode and second mode produce different sounds.

3. The electronic rodent repeller of claim 2, wherein the first mode is activated during dusk until dawn and the second mode is activated during dawn until dusk.

4. The electronic rodent repeller of claim 2, wherein the first mode is a tone mode and the second mode is a chat mode that produces the chattering sound.

5. The electronic rodent repeller of claim 1, wherein the chattering sound repeats at a rate of approximately one chattering sound per second to approximately twenty chattering sounds per second.

6. The electronic rodent repeller of claim 1, wherein the chattering sound repeats at a cycle of approximately four chattering sounds per second.

7. The electronic rodent repeller of claim 1, wherein the chattering sound has a duration of approximately 20 milliseconds to approximately 200 milliseconds.

8. The electronic rodent repeller of claim 1, comprising a time episode between approximately 30 seconds and approximately 3 hours.

9. An electronic rodent repeller, comprising:
(a) an audible signal generator; and
(b) a circuit operatively connected to the audible signal generator, wherein the circuit is configured to cause the audible signal generator to produce an audible signal in the form of a chattering sound that mimics a distressed rodent to discourage the rodent from remaining in a vicinity of the rodent repeller, wherein the chattering sound comprises a variable sound frequency, and, wherein the variable sound frequency is characterized by an upsweep from approximately 2 KHz to approximately 14 KHz followed by a downsweep.

10. An electronic rodent repeller, comprising:
(a) an audible signal generator; and
(b) a circuit operatively connected to the audible signal generator, wherein the circuit is configured to cause the audible signal generator to produce an audible signal in the form of a chattering sound that mimics a distressed rodent to discourage the rodent from remaining in a vicinity of the rodent repeller, wherein the chattering sound comprises a variable sound frequency, wherein the circuit generates a dual mode sound, the dual mode sound comprising a first mode and a second mode, wherein the first mode and second mode produce different sounds, and, wherein the first mode is activated during dusk until dawn and the second mode is activated during dawn until dusk.

11. An electronic rodent repeller, comprising:
(a) an audible signal generator; and
(b) a circuit operatively connected to the audible signal generator, wherein the circuit is configured to cause the audible signal generator to produce an audible signal in the form of a chattering sound that mimics a distressed rodent to discourage the rodent from remaining in a vicinity of the rodent repeller, wherein the chattering sound comprises a variable sound frequency, wherein the circuit generates a dual mode sound, the dual mode sound comprising a first mode and a second mode, wherein the first mode and second mode produce different sounds, and, wherein the first mode is a tone mode and the second mode is a chat mode that produces the chattering sound.

12. A method of repelling rodents comprising the step of using a sound generator to generate a chatter sound that mimics the natural sound created by frightened rodents, the chatter sound comprising a variable sound frequency, wherein the variable sound frequency is characterized by an upsweep from approximately 2 KHz to approximately 14 KHz followed by a downsweep.

13. A method of repelling rodents comprising the step of using a sound generator to generate a chatter sound that mimics the natural sound created by frightened rodents, the chatter sound comprising a variable sound frequency and a plurality of sound bursts having a time episode and a frequency, wherein each sound burst is approximately 50 milliseconds in duration, the frequency of each sound burst is approximately 4 Hz to approximately 11 Hz, and the time episode is approximately 30 minutes to approximately 3 hours.

14. An electronic rodent repeller, comprising:
(a) a first transducer;
(b) a second transducer; and
(c) a circuit operatively connected to the first and second transducers, wherein the circuit is configured to cause the first and second transducers to act in concert to produce an audible signal in the form of a chattering sound that mimics a distressed rodent to discourage the rodent from remaining in a vicinity of the rodent repeller, wherein the chattering sound comprises a variable sound frequency.

15. The electronic rodent repeller of claim 14, wherein the first transducer is selected from the group consisting of a piezo element and an electro-magnetic element.

16. The electronic rodent repeller of claim 14, wherein the second transducer is selected from the group consisting of a piezo element an electro-magnetic element.

* * * * *